(12) United States Patent
Kellerman et al.

(10) Patent No.: US 8,448,214 B2
(45) Date of Patent: May 21, 2013

(54) METHOD AND SYSTEM FOR PROVIDING COMPLETE INTERNET ANYWHERE WITH PARTIAL SERVER PROCESSING

(75) Inventors: Marcus Kellerman, San Diego, CA (US); Xuemin Chen, Rancho Sante Fe, CA (US); Vladimir Silyaev, Laguna Niguel, CA (US); David Erickson, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 456 days.

(21) Appl. No.: 12/650,145

(22) Filed: Dec. 30, 2009

(65) Prior Publication Data

US 2011/0119722 A1   May 19, 2011

Related U.S. Application Data

(60) Provisional application No. 61/261,780, filed on Nov. 17, 2009.

(51) Int. Cl.
*H04N 7/173* (2011.01)

(52) U.S. Cl.
USPC ........... 725/110; 725/100; 725/109; 725/112; 725/114; 725/138; 725/139

(58) Field of Classification Search
USPC .................. 725/109–112, 100, 114, 138–139
See application file for complete search history.

(56) References Cited

U.S. PATENT DOCUMENTS

| | | | |
|---|---|---|---|
| 6,463,445 B1 | 10/2002 | Suzuki et al. | |
| 2001/0056460 A1* | 12/2001 | Sahota et al. | 709/201 |
| 2002/0095687 A1* | 7/2002 | Shintani et al. | 725/112 |
| 2003/0070170 A1* | 4/2003 | Lennon | 725/51 |
| 2004/0031052 A1* | 2/2004 | Wannamaker et al. | 725/61 |
| 2005/0114757 A1* | 5/2005 | Sahota et al. | 715/501.1 |
| 2005/0188086 A1 | 8/2005 | Mighdoll et al. | |
| 2008/0104520 A1 | 5/2008 | Swenson et al. | |

(Continued)

FOREIGN PATENT DOCUMENTS

| | | |
|---|---|---|
| EP | 2111008 | 10/2009 |
| WO | WO2009134586 | 11/2009 |

OTHER PUBLICATIONS

EPO Communication dated Apr. 15, 2011 in Application No. 10014400.5-2202.

(Continued)

*Primary Examiner* — Pankaj Kumar
*Assistant Examiner* — Mulugeta Mengesha
(74) *Attorney, Agent, or Firm* — Thomas|Horstemeyer, LLP

(57) ABSTRACT

A method and/or system are described for providing complete Internet anywhere with partial server processing in which a request may be sent from a set-top-box (STB) to a server communicatively coupled with the STB to process a portion of a web page that is unsupported by a web browser running on the STB. The STB may receive a data stream from the server, wherein the server generates the data stream by processing the unsupported portion of the web page. The web page may be composited in the web browser based on the received data stream. The server may be located in a server computing cloud or may be a local server. The unsupported portion of the web page may comprise a binary plug-in. A supported portion of the web page may be rendered before or concurrently with the overlaying of the data stream during compositing.

18 Claims, 11 Drawing Sheets

U.S. PATENT DOCUMENTS

2008/0195692 A1 8/2008 Hayosh et al.
2008/0295110 A1* 11/2008 Muscarella et al. .......... 719/311
2009/0019151 A1 1/2009 Stavrakos et al.
2009/0119598 A1* 5/2009 Oztaskent .................... 715/733

OTHER PUBLICATIONS

Chinese Official Action in copending Chinese application 201010547853.9, mailed May 10, 2012.

* cited by examiner

METHOD AND SYSTEM FOR PROVIDING COMPLETE INTERNET ANYWHERE WITH PARTIAL SERVER PROCESSING

CROSS-REFERENCE TO RELATED APPLICATIONS/INCORPORATION BY REFERENCE

This Application makes reference to, claims priority to, and claims the benefit of U.S. Provisional Patent Application Ser. No. 61/261,780, filed on Nov. 17, 2009.

This application also makes reference to:
U.S. patent application Ser. No. 12/650,141, filed on Dec. 30,2009;
U.S. patent application Ser. No. 12/650,140, filed on Dec. 30,2009;
U.S. patent application Ser. No. 12/649,971, filed on Dec. 30,2009;
U.S. patent application Ser. No. 12/650,069, filed on Dec. 30,2009;
U.S. patent application Ser. No. 12/650,067, filed on Dec. 30,2009;
U.S. patent application Ser. No. 12/650,020, filed on Dec. 30,2009;
U.S. patent application Ser. No. 12/650,171, filed on Dec. 30,2009; and
U.S. patent application Ser. No. 12/649,998, filed on Dec. 30,2009.

Each of the above stated applications is hereby incorporated herein by reference in its entirety.

FIELD OF THE INVENTION

Certain embodiments of the invention relate to Internet browsing. More specifically, certain embodiments of the invention relate to providing complete Internet anywhere with partial server processing.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

There may be instances, however, in which the STB may not be configured to support and/or capable of processing certain content in a web page. Moreover, there may be instances in which the latency associated with rendering or displaying certain content in a web page may be long because of the processing capabilities of the STB. This may affect the overall experience of the user.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and/or system for providing complete Internet anywhere with partial server processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing complete Internet anywhere with partial server processing. In various embodiments of the invention, a method and/or system are described in which a request may be sent from a set-top-box (STB) to a server communicatively coupled with the STB to process a portion of a web page that is unsupported by a web browser running on the STB. The STB may receive a data stream from the server, wherein the server may generate the data stream by processing the unsupported portion of the web page. The web page may be composited in the web browser based on the received data stream. The various embodiments of the invention described herein may be utilized to implement complete Internet access anywhere in a home, or a place of work, or a public space, for example, where a user may want to obtain such access to the Internet.

Figure 1A:
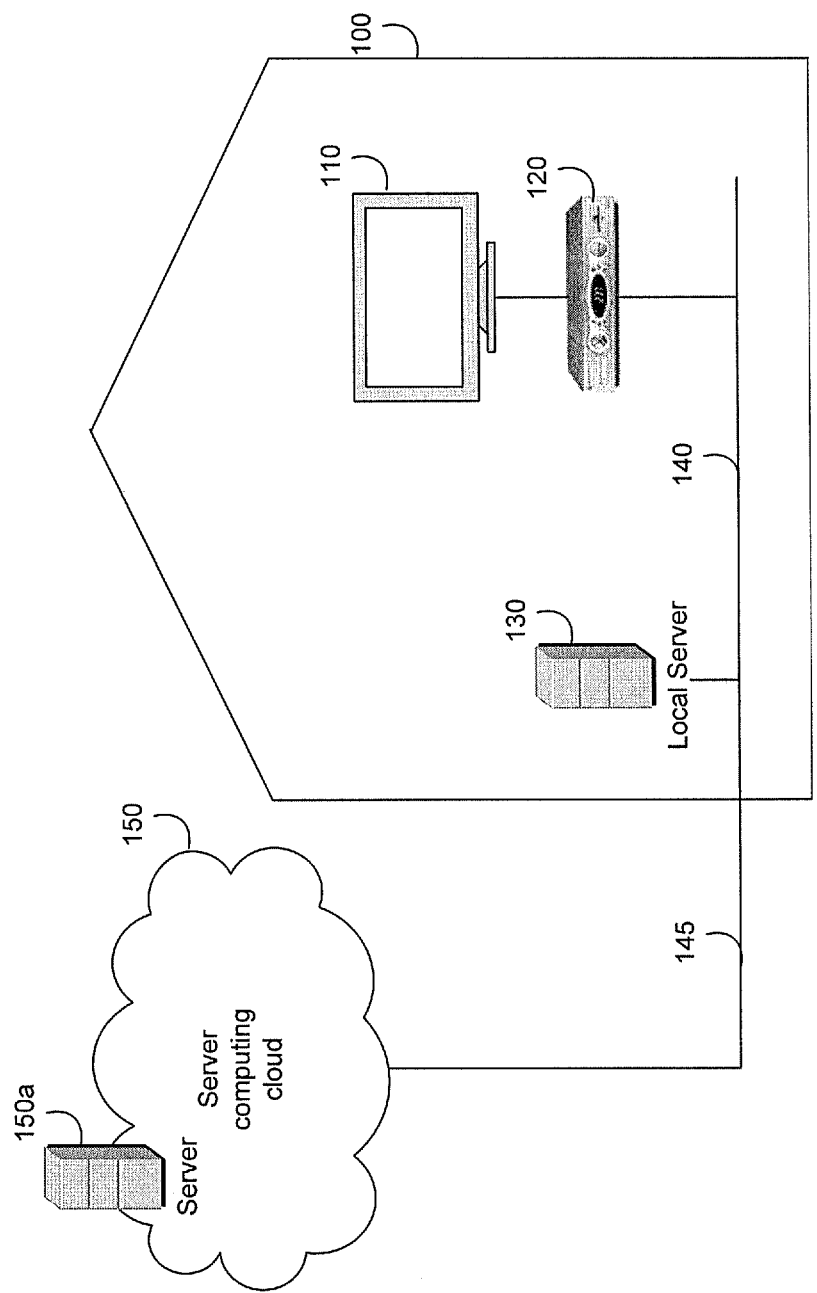
FIG. 1A is a diagram that illustrates an exemplary home or office configured to access Internet services via a set-top-box (STB), in accordance with an embodiment of the invention.

FIG. 1A is a diagram that illustrates an exemplary home or office configured to access Internet services via a set-top-box (STB), in accordance with an embodiment of the invention. Referring to FIG. 1A, there is shown a location 100 within which may be disposed a television 110, an STB 120, a local server 130, and a broadband connection 140. Also shown in FIG. 1A is a server computing cloud 150 coupled to the location 100 via a broadband connection 145.

The location 100 may be a home, a business, a school, a library, and/or other like setting in which a user may want to access the Internet and/or check their electronic mail (email). The position or placement of the television set 110, the STB 120, and/or the local server 130 within the location 100 may be based on user convenience and/or lifestyle. For example, when location 100 is a home (for example, a house, an apartment), the television 110 and the STB 120 may be located in a bedroom, a family room, or an entertainment room. In another example, when location 100 is a business or a public building, the television 110 and the STB 120 may be located in a conference room. The local server 130 may be located nearby (for example, in the same room) the television set 110 and the STB 120 or may be located remotely (for example, in another room or nearby building) from the television set 110 and the STB 120. In some embodiments of the invention, the broadband connection 140 may provide a wired connection that communicatively couples two or more devices within the location 100 utilizing a coaxial cable, for example. In other embodiments of the invention, in addition to wired connectivity, a portion of the broadband connection 140 may provide a wireless connection between two or more devices within the location 100.

The television 110 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television 110 may be operable to support one or multiple technical standards such as digital television (DTV) and high-definition television (HDTV), for example. The resolution of the screen or display portion of the television 110 may be based on the technical standard supported by the television 110. For example, for HDTV, the resolution of the screen may be 720p, 1080i, or 1080p, where the numeral indicates the vertical resolution of the screen, the letter "p" refers to progressive-scan format, and the letter "i" refers to interlaced-scan format.

The STB 120 may comprise suitable logic, circuitry, code, and/or interfaces that may be operable to connect the television 110 to an external source of signals and to convert those signals into content that may be displayed on the screen of the television 110. The STB may be operable to provide processing associated with managing, delivering, and/or storing video content that may be displayed on the television 110.

The STB 120 may also be operable to run a web browser that may be displayed on the screen of the television 110 for user interaction. A web browser is typically a software application that may enable a user to retrieve, present, or review information resources available on, for example, the World Wide Web ("the Web"). An information resource may comprise a web page, an image, video, text, graphics, and/or other type of multimedia content, for example. A web browser may also be utilized to access information that is provided by web servers in private networks and/or files in file systems. Examples of web browsers may comprise Internet Explorer, Mozilla Firefox, Apple Safari, Google Chrome, Opera, and/or browsers that may be native or custom-made for the STB 120.

Information resources are brought to the user via the web browser when the user inputs a Uniform Resource Identifier (URI) into the web browser. In this regard, the prefix of the URI may be utilized to determine how to interpret the URI. For example, a URI that starts with "http:" may identify a resource to be retrieved over Hypertext Transfer Protocol (HTTP). Other prefixes that may be supported include "https:" for HTTP Secure (HTTPS), "ftp:" for the File Transfer Protocol (FTP), and "file:" for local files, for example. A Uniform Resource Locator (URL) is typically a subset of the URI that specifies the location where an information resource is available for retrieval and/or the mechanism for retrieval.

Once the information resource has been retrieved, the web browser may be operable to display it. For example, HyperText Markup Language (HTML) may be passed to a layout engine in the web browser to be transformed from markup representation to an interactive document. In addition to HTML, web browsers may display different types of content on a web page. For example, web browsers may display images, audio, video, and/or Extensible Markup Language (XML) files, and often comprise and/or support certain plug-ins for, for example, Flash applications and/or Java applets. In one embodiment of the invention, in instances when a file of an unsupported type or a file that is set up to be downloaded rather than displayed is encountered, the browser may prompt the user to save the file to fixed and/or removable memory storage, for example, a memory in the set-top-box. In another embodiment of the invention, the web browser may present one or more requests to the local server 130 or to a server in the server computing cloud 150 to assist with handling at least a portion of the unsupported content.

The local server 130 may comprise suitable logic, circuitry, code, and/or interfaces that may be operable to run or execute certain software applications that may be accessible from the STB 120 via the broadband connection 140. In this regard, the local server 130 may be operable to provide support to the web browsing operations provided by the STB 120. The local server 130 may be implemented in a computing device, comprising for example a personal computer, laptop, tablet, or in a networking device, comprising for example, a router, which may provide processing capabilities that are sufficient for performing particular software applications. For example, in instances when the local server 130 is utilized to support web browsing operations in the STB 120, the processing capabilities in the local server 130 may be sufficient to run or execute software applications that provide such support.

The server computing cloud 150 may comprise a plurality of servers and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers in the server computing cloud 150 may be utilized to provide reliable services that may be delivered through individual servers and/or data centers, for example. The server computing cloud 150 may appear, to a user or to a location (for example, location 100), as a single point of access to services and/or resources that may be provided by the server computing cloud 150. The servers in the server computing cloud 150 may comprise, for example, applications servers that may be dedicated to running certain software applications and/or web servers in which HTTP clients connect to send commands and receive responses along with data content.

A web server (not shown) in the server computing cloud 150, for example, may comprise suitable logic, circuitry, code, and/or interfaces that may be operable to deliver to a client (for example, the STB 120) web pages (for example, HTML documents) and associated content (for example, images, style sheets, JavaScripts). When a client requests a specific information resource using HTTP, the web server may respond by providing the content associated with that information resource. A full implementation of HTTP may enable the web server to receive content from a client.

A server 150*a* in the server computing cloud 150, such as an applications server, for example, may be utilized to support web browsing operations in the STB 120. In such instances, the server 150*a* in the server computing cloud 150 may have processing capabilities sufficient to run or execute software applications that provide such support. The server 150*a* may also be referred to as a render server or an STB assistance server, for example, to indicate that the server 150*a* may be operable to assist the STB 120 to render web content. Whether the server 150*a* in the server computing cloud 150 or the local server 130 is utilized to support web browsing operations in the STB 120 may depend, at least in part, on the amount of latency that may be acceptable to a user when having web browsing operations in the STB 120, such as the rendering of a web page, for example, be supported or assisted by another resource. In this regard, a local resource (for example, the local server 130) may have lower latency than a remote resource (for example, the server 150*a* in server computing cloud 150). Whether the server 150*a* in the server computing cloud 150 or the local server 130 is utilized to support web browsing operations in the STB 120 may also depend, for example, availability of the local server 130, available resources on the local server 130, and/or on the processing capabilities and the type of support that may be provided. The server 150*a* need not be physically collocated with a web server. The server 150*a* may be in different location from the web server.

The server computing cloud 150 may connect to the location 100 via a broadband connection 145. The broadband connection 145 may provide a wired connection between the server computing cloud 150 and the broadband connection 140 in the location 100 utilizing a coaxial cable, for example. Other embodiments, however, need not be so limited. For example, the broadband connection 145 may comprise a combination of wired and wireless portions, wherein the wired portion may utilize coaxial cables, optical fibers, and/or other large bandwidth transmission medium.

In operation, a user may decide to access a web page via a web browser in the STB 120 that is being displayed in the television 110 while comfortably sitting in his/her living room. The user may submit a URL to the web browser, which in turn sends a request for the information resource associated with that URL to a web server. The web server may pass the HTML and/or related content or information associated with the URL to the STB 120. The STB 120 may perform a pre-fetch operation of the web page information provided by the web server to determine the type of content (for example, supported or unsupported content) that is comprised within the web page. The STB 120 may be operable to perform the pre-fetch operation as a background process, for example.

In instances when certain portions of the web page are not supported by the web browser in the STB 120, the STB 120 may send one or more requests to a server that is operable to provide web browsing support to the STB 120. In some embodiments, the portions unsupported may comprise a plug-in, for example. In this regard, the STB 120 may send requests via an upper link to the local server 130 or to the server 150*a* in the server computing cloud 150. The request may comprise information regarding the URL associated with the unsupported content, the size of the unsupported content in the web browser, and/or events associated with the unsupported content. The requests may be sent to the server to process as background jobs, for example. Once such information is received by the server providing web browsing support to the STB 120, the server may in turn request and obtain the unsupported content from the corresponding web server, may process the unsupported content, and may encode the processed content into a format that may be received by the STB 120. In one exemplary embodiment of the invention, the processed content may be encoded with a low latency encoder protocol such as H.264/Advanced Audio Coding (ACC). In this regard, the server providing web browsing support to the STB 120 may be operable to transcode or provide direct conversion from one encoding format to another encoding format. In some embodiments of the invention, the transcoding may comprise changing the bitstream format of one file to another bitstream format without undergoing a decoding and re-encoding process.

The resulting audio and video (A/V) content produced at the server may then be streamed to the STB 120, which in turn decodes the A/V stream and places the resulting information in the appropriate portion of the web page to composite the complete web page. The portions of the web page that are supported by the web browser in the STB 120 may be rendered before or concurrently with the information provided by the server. In other words, the data provided by the server may be sent to the STB 120 when needed to composite the complete page according to a predetermined approach or scheme. For example, the combination of supported and unsupported images and/or related content may be done utilizing a two-pass scheme in which supported content is rendered by the STB 120 first and unsupported content from the server is placed or overlaid on the web browser by the STB 120 after the supported content. In another example, the combination of supported and unsupported images and/or related content may be done utilizing a single-pass scheme in which the supported content is rendered by the STB 120 concurrently with the placement of the unsupported content from the server. Once the user moves away from that particular web page, the server may terminate the jobs related to that web page.

In another embodiment of the invention, the STB 120 may be operable to have all web page content handled by the server providing web browsing support to the STB 120. In such embodiments, the server may receive the URL information associated with the web page from the STB 120 and may in turn request the contents of the web page from the web server. The server may then encode the information in a format that may be received by the STB 120 and may stream the A/V content to the STB 120 to composite the complete web page.

In some instances, the web browser in the STB 120 may not be capable of providing support for certain content (for example, binary plug-ins) because such content is not native to the processor being utilized in the STB 120. For example, plug-ins that have been developed or coded for execution in an x86-based processor architecture may not be supported in a set-top-box having a processor based on a Microprocessor without Interlocked Pipeline Stages (MIPS) architecture. In such instances, changing the set-top-box design and/or providing an emulator of the x86-based processor in the set-top-box may be prohibitive.

Although the STB 120 with a broadband connection capability is illustrated in FIG. 1A for full internet experience, the invention may not be so limited. Accordingly, instead of the STB 120, the television 110 itself with a broadband connection capability for full Internet experience may be supported without departing from the spirit and scope of various embodiments of the invention.

Figure 1B:
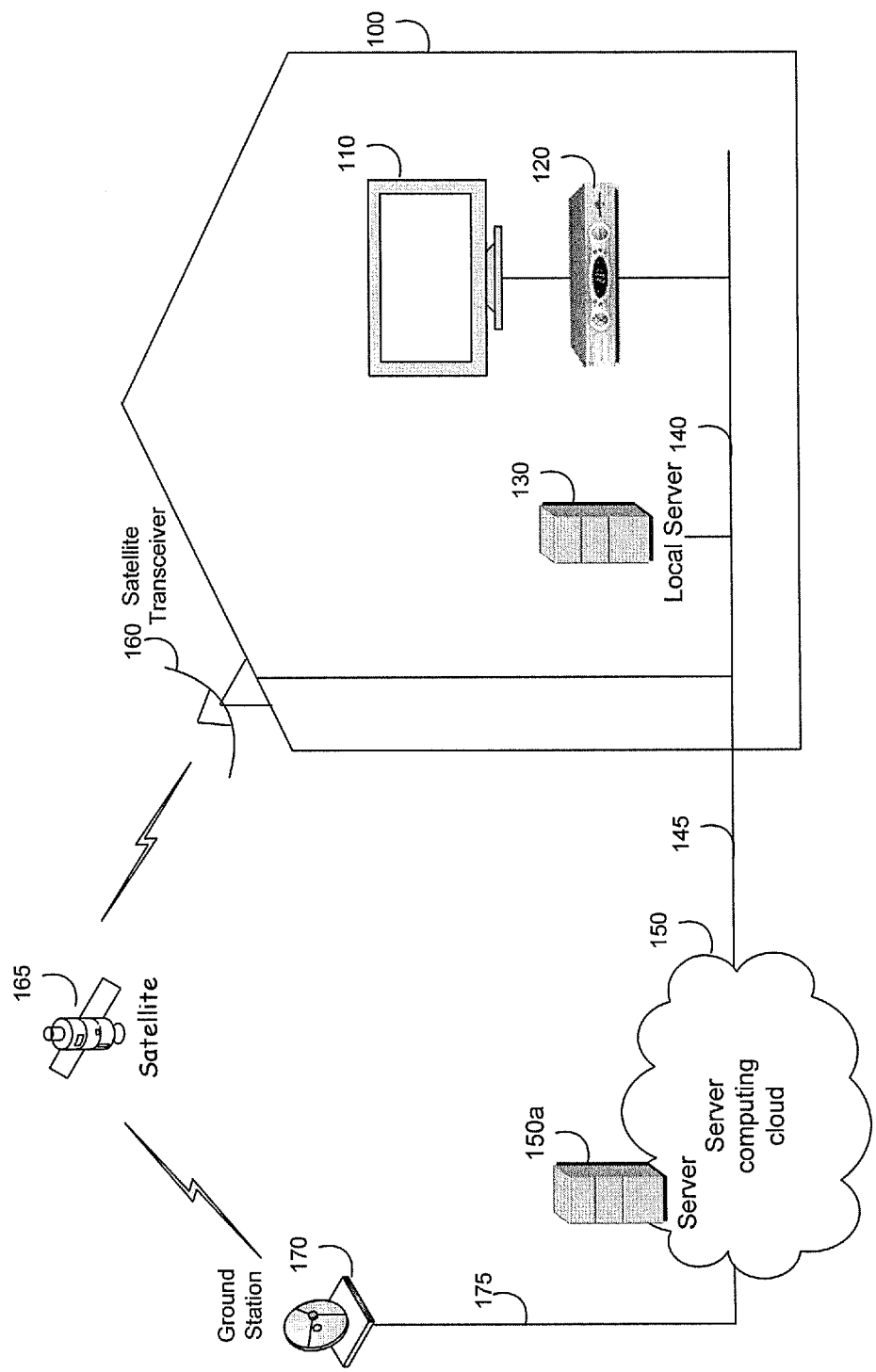
FIG. 1B is a diagram that illustrates another exemplary home or office configured to access Internet services via an STB, in accordance with an embodiment of the invention.

FIG. 1B is a diagram that illustrates another exemplary home or office configured to access Internet services via an STB, in accordance with an embodiment of the invention. Referring to FIG. 1B, there is shown the location 100, the television 110, the STB 120, the local server 130, the broadband connections 140 and 145, and the server computing cloud 150 described above with respect to FIG. 1A. Also shown in FIG. 1B are a ground station 170 communicatively coupled to the server computing cloud 150 via a broadband connection 175, a satellite 165, and a satellite receiver 160 coupled to the location 100. The satellite receiver 160 may be operable to communicate with the STB 120 via the broadband connection 140 in the location 100.

The ground station 170, the satellite 165, and the satellite receiver 160 may be operable to enable the STB 120 to communicate with the server 150a in the server computing cloud 150 that may be operable to provide web browsing support to the STB 120 and/or with a web server from which web page information may be retrieved, for example. The ground station 170 and/or the satellite 165 shown in the location 100 are illustrated only as an exemplary configuration. Other configurations for the location 100 may be applied without departing from the scope of the present invention. For example, a different or the same configuration for the location 100 may be implemented to deliver television programs and/or broadband Internet to, for example, a vestigial sideband broadcast (VSB) off-air STB and/or a cable STB.

In operation, requests from the STB 120 to a remote resource (for example, the server 150a in the server computing cloud 150) for support in handling either portions of a web page or the entire web page may be communicated via the broadband connection 145 and/or via the wireless links associated with the ground station 170, the satellite 165, and the satellite transceiver 160, and the broadband connection 175. Similarly, streams of processed A/V content from the remote resource may be received by the STB 120 via the broadband connection 145 and/or via the wireless links associated with the ground station 170, the satellite 165, and the satellite transceiver 160.

Figure 1C:
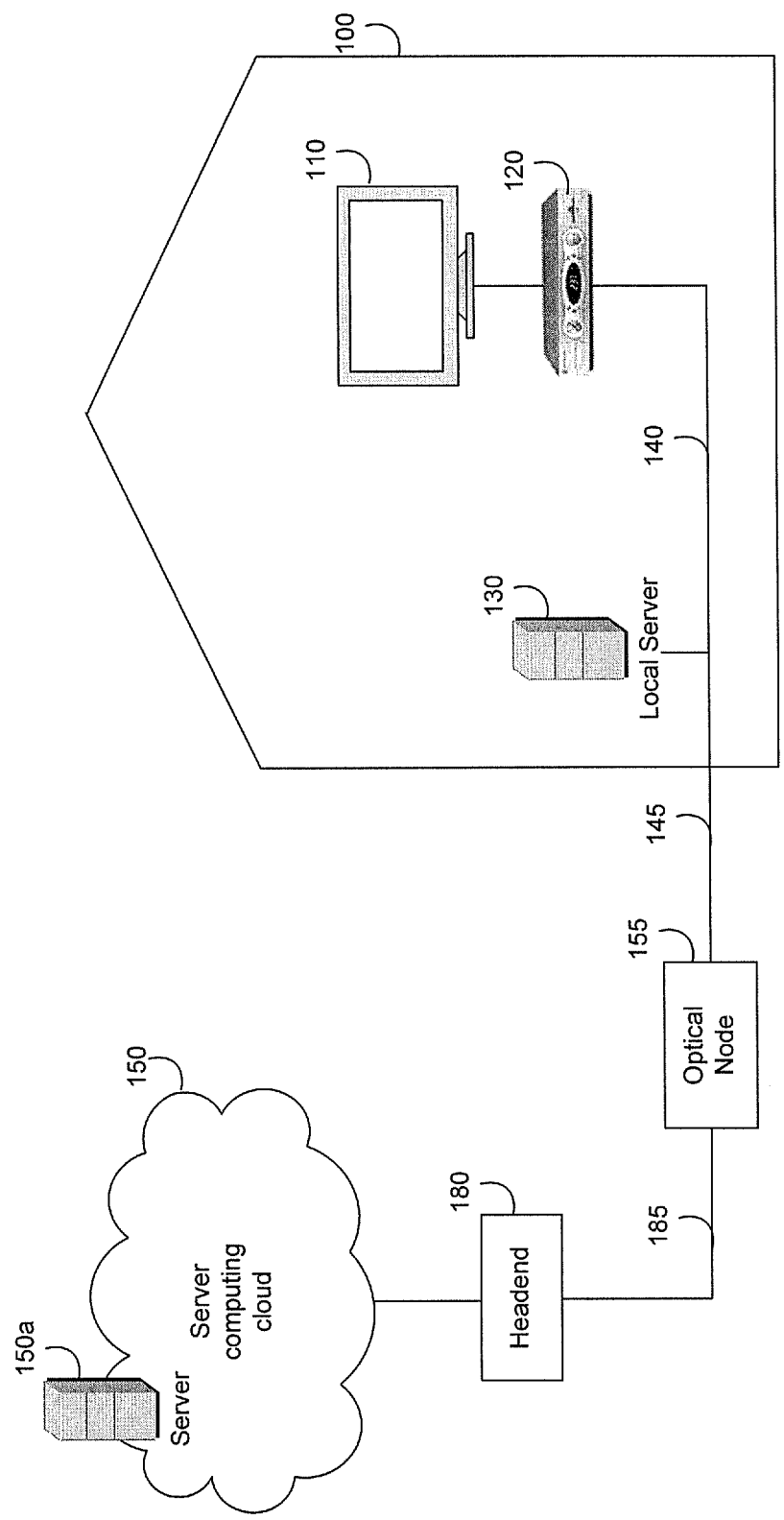
FIG. 1C is a diagram that illustrates yet another exemplary home or office configured to access Internet services via an STB using a switched digital video (SDV) scheme, in accordance with an embodiment of the invention.

FIG. 1C is a diagram that illustrates another exemplary home or office configured to access Internet services via an STB using a switched digital video (SDV) scheme, in accordance with an embodiment of the invention. Referring to FIG. 1C, there is shown the location 100, the television 110, the STB 120, the local server 130, the broadband connections 140 and 145, and the server computing cloud 150 described above with respect to FIG. 1A. Also shown in FIG. 1C, are a headend 180 communicatively coupled to the server computing cloud 150. Moreover, there is shown an optical node 155 in which one end is communicatively coupled to the headend 180 via a broadband connection 185 (for example, fiber optical link) and another end is communicatively coupled to the location 100 via the broadband connection 145 (for example, coaxial cable).

The headend 180, the broadband connection 185, and the optical node 155 may be utilized to provide a SDV scheme. In such a scheme, content for unwatched channels in a typical cable television system need not be sent and, thus, the available bandwidth may be increased. The unused channels in the broadband connection 185 may now be used by the STB 120 to communicate with the server 150a in the server computing cloud 150 that may be operable to provide web browsing support to the STB 120. Since the channel may be dedicated to such communication between the STB 120 and the server, the web browsing support may be provided with low latency. In such an embodiment of the invention, utilizing a remote resource (for example, the server 150a in the server computing cloud 150) with large processing capabilities may be more suitable in certain circumstances than utilizing a local resource (for example, the local server 130) that may have more limited processing capabilities.

In operation, the STB 120 may utilize an unused broadcasting channel to establish a dedicated channel for communicating with the server 150a in the server computing cloud 150 that provides web browsing support to the STB 120. Data from the server may be sent to the STB 120 through this dedicated channel. Once the support from the server 150a in the server computing cloud 150 is no longer needed, the channel may be released from the headend 180 and may become available for the transmission of television programming, for example.

Figure 1D:
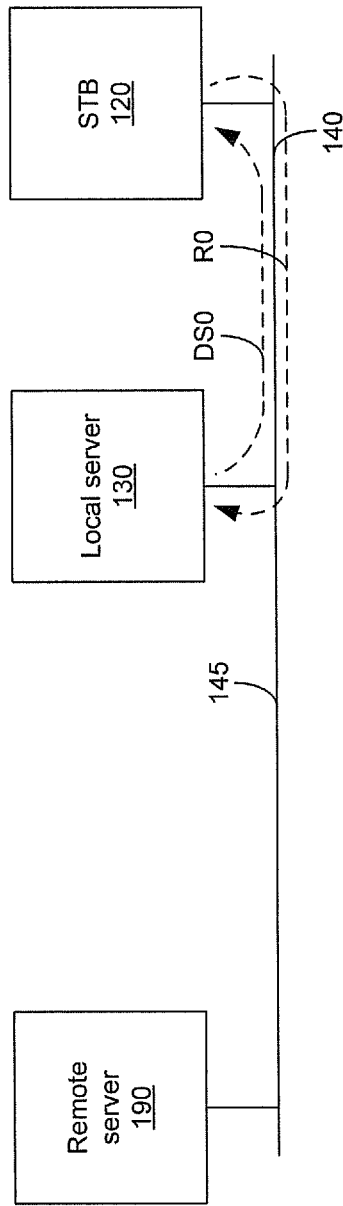
FIG. 1D is a diagram that illustrates providing exemplary web browsing support for an STB by a local server, in accordance with an embodiment of the invention.
Figure 1E:
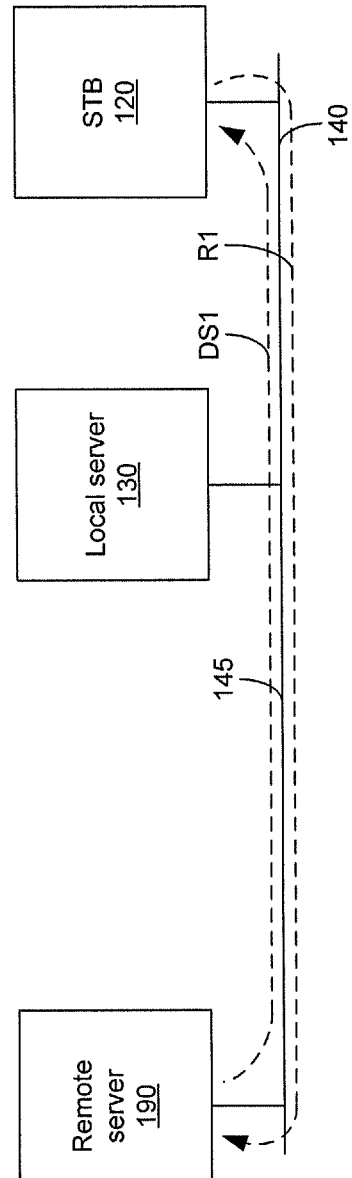
FIG. 1E is a diagram that illustrates providing exemplary web browsing support for an STB by a remote server, in accordance with an embodiment of the invention.

FIGS. 1D and 1E are each a diagram that illustrates providing exemplary web browsing support for an STB by a local server and a remote server, respectively, in accordance with an embodiment of the invention. Referring to FIG. 1D, there is shown the STB 120, the local server 130, and a remote server 190. The remote server 190 may correspond to the server 150a in the server computing cloud 150, for example. The STB 120 is shown communicatively coupled to the local server 130 via the broadband connection 140. The STB 120 is shown to be communicatively coupled to the remote server 190 via the broadband connections 140 and 145. In some embodiments of the invention, the broadband connections 140 and 145 may be coupled by, for example, a media gateway (not shown).

In some embodiments, the STB 120 may be configured to utilize the local server 130 for handling web browsing support requests from the STB 120. In such embodiments, the STB 120 may send one or more requests, R0, to the local server 130 for assistance in handling portions of a web page. Once the request or requests are received by the local server 130, the local server 130 may process the request and produce a data stream, DS0, which is sent to the STB 120 to composite or render the complete page according to a predetermined approach or scheme. The data stream DS0 may comprise audio and/or video. Once the user moves away from that particular web page, the local server 120 may suspend or terminate the jobs related to that web page.

Referring to FIG. 1E, in some embodiments of the invention, the STB 120 may be configured to utilize the remote server 190 for handling web browsing support requests from the STB 120. In such embodiments, the STB 120 may send one or more requests, R1, to the remote server 190 for assistance in handling portions of a web page. Once the request or requests are received by the remote server 190, the remote server 190 may process the request and produce a data stream, DS1, which is sent to the STB 120 to composite or render the complete page according to a predetermined approach or scheme. The data stream DS1 may comprise audio and/or video. Once the user moves away from that particular web page, the remote server 190 may terminate the jobs related to that web page.

In some embodiments of the invention, the STB 120 may be configured to send some requests, R0, to the local server 130, and other types of requests, R1, to the remote server 190. In such embodiments, whether certain types of requests are handled locally or remotely by a server may be based, at least partially, on the latency of the operations provided by the server and/or on the ability of the server to process certain types of requests.

Figure 2:
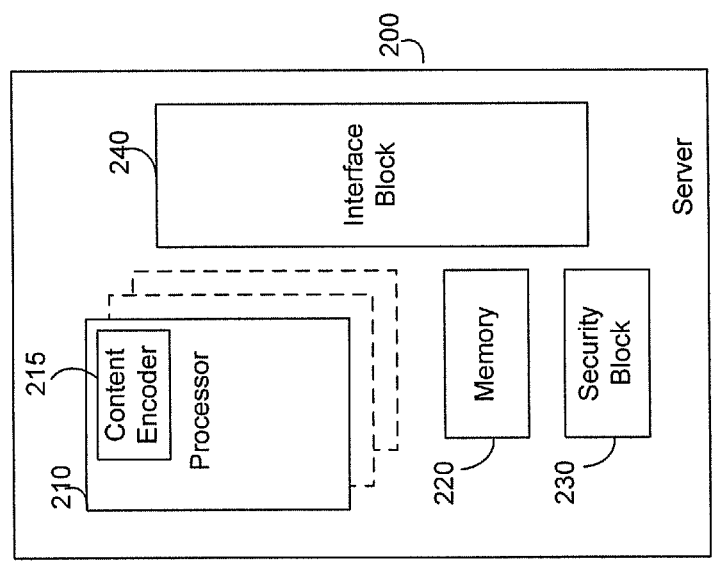
FIG. 2 is a block diagram that illustrates an exemplary server that supports web page rendering by a local web browser in an STB, in accordance with an embodiment of the invention.

FIG. 2 is a block diagram that illustrates an exemplary server that supports web page rendering by a local web browser in an STB, in accordance with an embodiment of the invention. Referring to FIG. 2, there is shown a server 200 that may comprise a processor 210, a content encoder 215, a memory 220, a security block 230, and an interface block 240. The content encoder 215 may be optional.

In some embodiments, the server 200 may correspond to the local server 130 and may be operable to provide web browsing support to the STB 120 described above, for example. In other embodiments, the server 200 may correspond to the server 150a in the server computing cloud 150 that may be operable to provide web browsing support to the STB 120.

The processor 210 may comprise suitable logic, circuitry, code, and/or interfaces that may be operable to process requests from the STB 120 to handle at least a portion of the content of a web page for subsequent rendering by the STB 120. In this regard, the processor 210 may be operable to convert and/or transcode content from one format into another format. For example, the processor 210 may be operable to process plug-ins unsupported by the web browser in the STB 120 and may encode such processed plug-ins with a low latency H.264/ACC encoder. The processor 210 may comprise a plurality of different encoders that may be utilized to encode different types of contents from a web page into different formats, for example.

The content encoder 215 may comprise suitable logic, circuitry, interfaces and/or code that may be operable to transform data processed by the processor 210 into format supported by the STB 120.

In some embodiments of the invention, the processor 210 may comprise an x86-based architecture that may support processing of, for example, certain plug-ins developed or coded for execution in an x86-based processor architecture. In other embodiments, the server 200 may be operable to provide an emulator of the x86-based processor to process certain content unsupported by the STB 120.

The server 200 may comprise a plurality of processors 210, as indicated by the dashed outlines illustrated in FIG. 2. A single server 200 may be operable to support a plurality of STBs 120. In such instances, the server 200 may be operable to provide load balance and/or load sharing capabilities.

The memory 220 may comprise suitable logic, circuitry, code, and/or interfaces that may be operable to store information associated with the operation of the processor 210. The memory 220 may be operable to store information (for example, coefficients, tables) associated with the encoding operations supported by the processor 210.

The security block 230 may comprise suitable logic, circuitry, code, and/or interfaces that may be operable to support authentication operations, certificate usage, and/or cryptographic operations that may be utilized to provide secure connections between the server and the STB 120, for example.

The interface block 240 may comprise suitable logic, circuitry, code, and/or interfaces that may be operable to enable the server 200 to communicate with the STB 120 and/or with a web server from which to obtain web page information, for example. The interface block 240 may support a plurality of physical and/or logical connections or interfaces. When the server 200 corresponds to the local server 130 described above, the interface block 240 may support communication with the STB 120 via the broadband connection 140 (for example, coaxial cable).

In operation, the server 200 may receive a request from the STB 120 and may obtain unsupported and/or supported content from the corresponding web server, may process the content received, and may encode the processed content into a format that may be received by the STB 120. The processing of unsupported content may comprise rendering unsupported plug-ins and/or other unsupported content, for example. The processing of supported content may comprise rendering supported plug-ins and/or other supported content. The resulting A/V content produced at the server 200 may then be streamed to the STB 120, which in turn decodes the A/V stream and composites the complete web page.

In some embodiments of the invention, when the content that may need to be processed in the server 200 is secure content, the server 200 and the STB 120 may need to perform a two-way authentication operation before establishing a secure link between them and having the STB 120 share credentials with the server 200.

Figure 3:
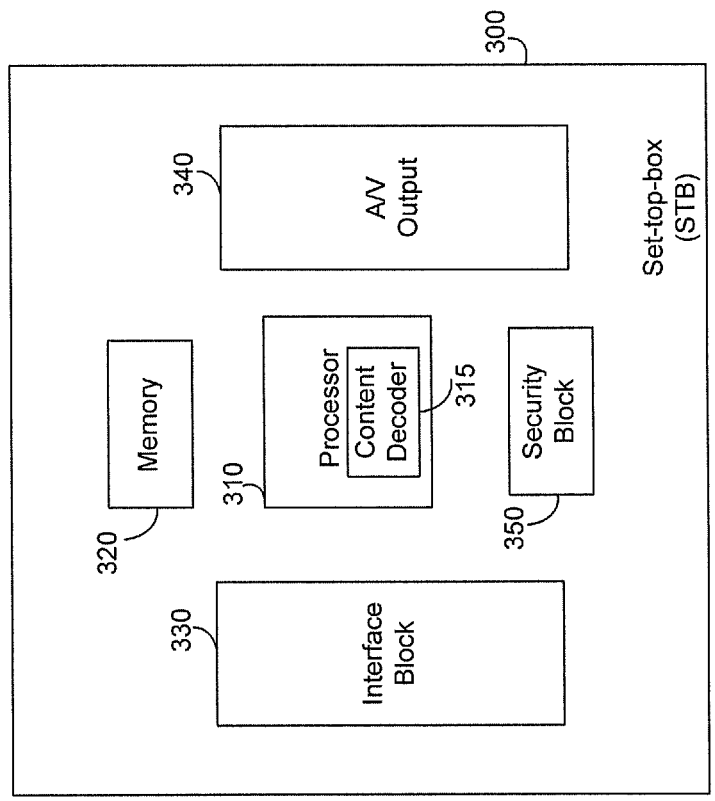
FIG. 3 is a block diagram that illustrates an exemplary STB that enables a user of the STB to access Internet services, in accordance with an embodiment of the invention.

FIG. 3 is a block diagram that illustrates an exemplary STB that enables a user of the STB to access Internet services, in accordance with an embodiment of the invention. Referring to FIG. 3, there is shown an STB 300 that may comprise a processor 310, a content decoder 315, a memory 320, a security block 350, an interface block 330, and an A/V output 340. The content decoder 315 may be optional. In some embodiments, two or more of the components of the STB 300 may be integrated into a single chip.

The processor 310 may comprise suitable logic, circuitry, code, and/or interfaces that may be operable to provide processing associated with managing, delivering, and/or storing video content that may be displayed on, for example, the television 110 described above. The processor 310 may also be operable to run or execute a web browser that may be displayed on the screen of the television 110 for user interaction.

The processor 310 may be operable to perform a pre-fetch operation of web page information provided by a web server to determine the type of content that is comprised within the web page. The processor 310 may be operable to perform the pre-fetch operation as a background process, for example.

The processor 310 may be operable to make one or more requests for handling either certain portions of a web page or the entire web page to a server that is operable to provide web browsing support to the STB 300. The processor 310 may be operable to receive an A/V stream from such server and composite a complete web page on the web browser. In this regard, the processor 310 may be operable to render supported content from a web page, such as plug-ins, graphics, text, or the like, for example, on a web browser, and compositing the complete web page on the web browser by placing decoded A/V streams from a server on top of the generated or rendered content. In some embodiments of the invention, the processor 310 may render the supported visual portions of the web page concurrently with the placement of the decoded A/V streams from a server.

The content decoder 315 may comprise suitable logic, circuitry, interfaces and/or code that may be operable to transform data encoded by the local server 130 or the server computing cloud 150 into a desired format for display.

The memory 320 may comprise suitable logic, circuitry, code, and/or interface that may be operable to store information associated with the operation of the processor 310.

The security block 350 may comprise suitable logic, circuitry, code, and/or interfaces that may be operable to support authentication operations, certificate usage, and/or cryptographic operations that may be utilized to provide a secure connection between a server, which may be operable to provide web browsing support to the STB 300, and the STB 300, for example.

The interface block 330 may comprise suitable logic, circuitry, code, and/or interfaces that may enable the STB 330 to interface with a plurality of devices, including render servers and/or web servers. For example, the interface block 330 may support connections with cable TV services and/or satellite services. The interface block 330 may support multiple ports such as High-Definition Multimedia Interface (HDMI), Ethernet Physical Layer (PHY), Universal Serial Bus (USB), and RS232, for example. Other types of connections, protocols, and/or ports may also be supported.

The A/V output 340 may comprise suitable logic, circuitry, code, and/or interfaces that may be operable to provide audio and/or video content for display or reproduction to, for example, the television 110 described above. In this regard, the A/V output 340 may support multiple technical standards such as DTV and HDTV, and/or multiple screen resolutions.

Although an STB with a broadband connection capability is illustrated in FIG. 3 for full Internet experience, the invention may not be so limited. Accordingly, other devices such as a television itself with a broadband connection capability for full Internet experience may be supported without departing from the spirit and scope of various embodiments of the invention.

In operation, a web browser may be run in the STB 300 and may be displayed in a television, for example television 110, via the A/V output 340. When a user interacts with the web browser, for example via a set-top-box remote control or keyboard, and submits a URL to the web browser, the STB 300 may send a request for the information resource associated with that URL to a web server via the interface block 330. The web server may pass the HTML and/or related content or information associated with the URL to the STB 300 via the interface block 330. The processor 310 may perform a pre-fetch operation of the web page information provided by the web server to determine the type of content that is comprised within the web page.

The processor 310 may send one or more requests to a server that is operable to provide web browsing support to the STB 300 via the interface block 330. The request may comprise information regarding the URL of the web page. In response, the server may send an A/V stream to the STB 300. The processor 310 in the STB 300 may decode the A/V stream and may render the resulting information to composite the complete web page.

Figure 4:
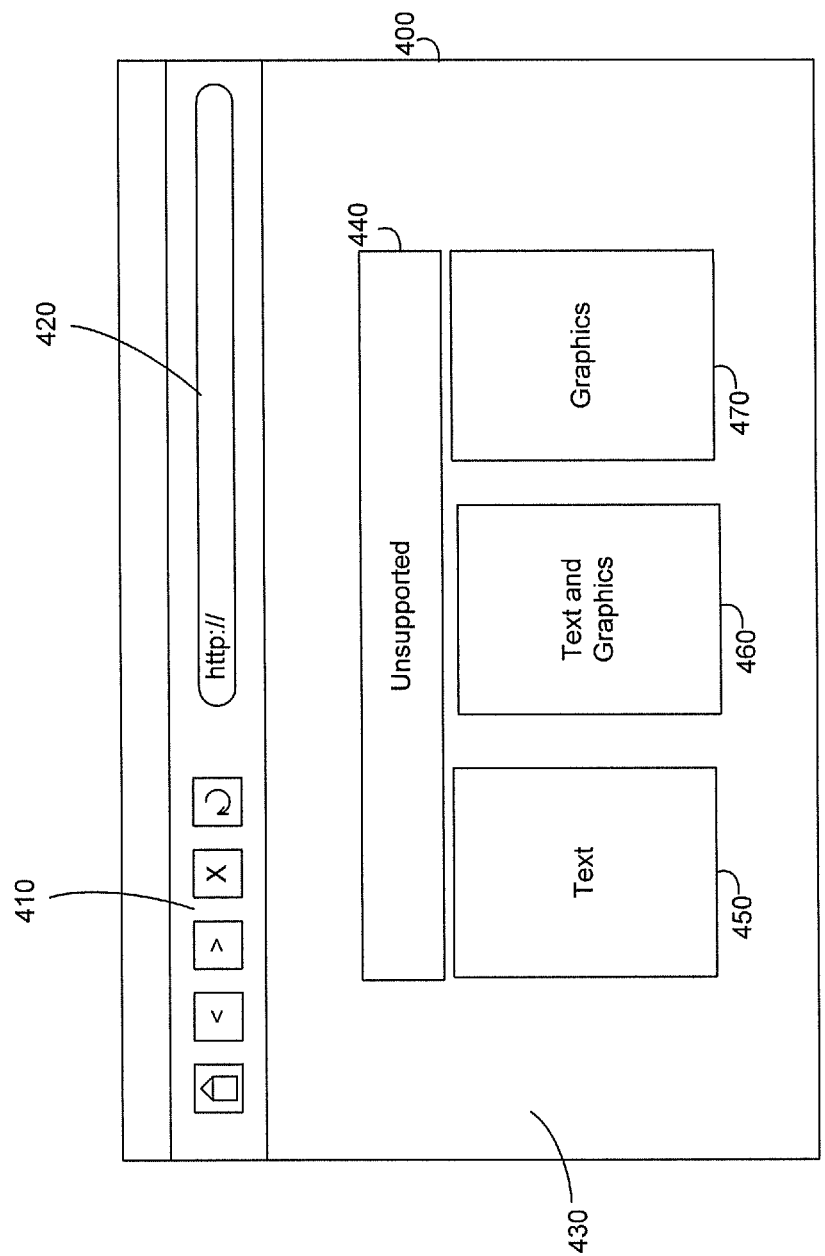
FIG. 4 is a diagram that illustrates an exemplary web page with multiple content types that is to be displayed by a local web browser in an STB, in accordance with an embodiment of the invention.

FIG. 4 is a diagram that illustrates an exemplary web page with multiple content types that is to be displayed by a local web browser in an STB, in accordance with an embodiment of the invention. Referring to FIG. 4, there is shown a web browser 400 in which a web page 430 is to be displayed or rendered. The web browser 400 may comprise certain user interface elements 410 (for example, back, forward, reload, stop, home) that may be utilized for navigation and/or operation, and an address bar 420 that may be utilized to submit a URI.

The web page 430 to be displayed in the web browser 400 may comprise different types of contents. In the example illustrated in FIG. 4, the web page 430 may comprise a text portion 450, a text and graphics portion 460, a graphics portion 470, and an unsupported (for example, plug-ins) portion 440. When the STB performs a pre-fetch operation to determine the types of content in the web page, it may determine that the unsupported portion 440 may be a portion of the web page for which the STB may need support from a sever. In this regard, the STB may identify the unsupported portion 440 to a server via a request for assistance. The server may then process the unsupported portion 440 and may subsequently provide the processed content associated with the unsupported portion 440 back to the STB in a format that the STB may utilize to composite the web page 430 in the web browser 400.

Figure 5A:
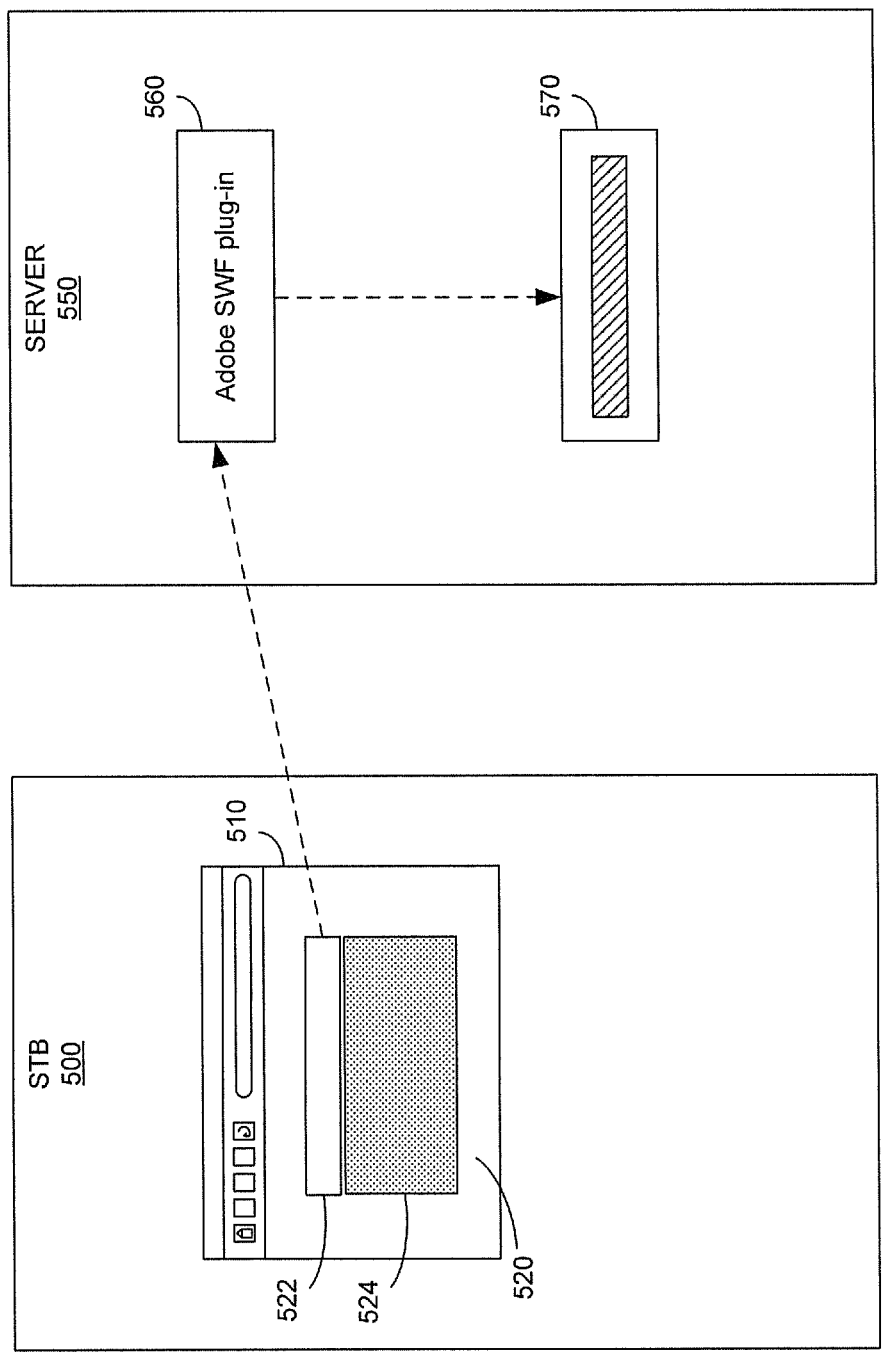
FIGS. 5A and 5B are each a diagram that illustrates an example of partial web browsing support of an STB by server processing, in accordance with an embodiment of the invention.
Figure 5B:
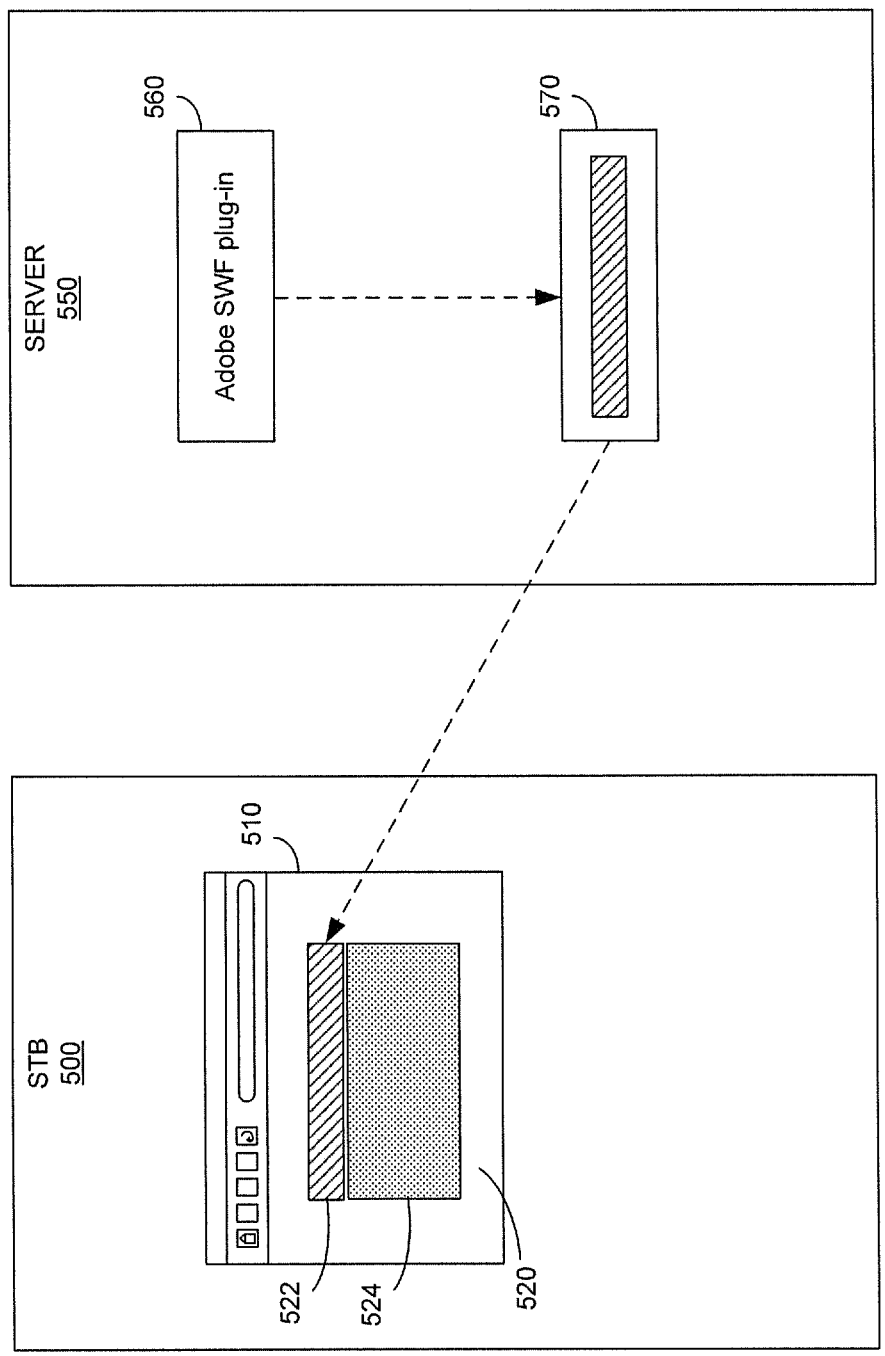

FIGS. 5A and 5B are each a diagram that illustrates an example of partial web browsing support of an STB by server processing, in accordance with an embodiment of the invention. Referring to FIG. 5A, there is shown an STB 500 and a server 550. The STB 500 may correspond to, for example, the STB 120 described above. In this regard, the STB 500 may have an architecture that is substantially similar to the exemplary architecture of the STB 300 described above. The server 550 may correspond to, for example, the local server 130 and/or the server 150a in the server computing cloud 150 described above. In this regard, the server 550 may have an architecture that is substantially similar to the exemplary architecture of the server 200 described above.

Also shown in FIG. 5A is a web browser 510 running on the STB 500. The web browser 510 may be displayed on a television or other display device communicatively coupled with the STB 500 to enable user interaction. Illustrated in the web browser 510 is a web page 520, which is to be composited by the STB 500. The web page 520 may comprise a portion 524 (shown in a dotted pattern) that is supported by the web browser 510, and thus, by the STB 500. The web page 520 may also comprise a portion 522 (shown blank) that is unsupported by the web browser 510, and thus, by the STB 500. In the example shown in FIG. 5A, the unsupported content in the web page 520 may be an Adobe Shockwave Flash (SWF) plug-in.

In operation, the STB 500 may determine that the web page 520 comprises a portion 522 associated with an unsupported plug-in. The STB 500 may send a request to the server 550 to assist in the handling processing of the plug-in. The request may comprise one or more of the plug-in URL, the size of the plug-in in the web page 520, and other related events associated with the plug-in. The server 550 may receive the request and obtain an instance of the Adobe SWF plug-in 560 based on the URL information provided by the STB 500. The server 550 may then process the plug-in 560 and may encode the resulting output from the processing with a low latency encoding operation such as H.264/AAC to produce an A/V data 570 (shown in dashed lines).

Referring to FIG. 5B, after the A/V data is produced by the server 550, the server 550 may stream the A/V data to the STB 500. The STB 500 may then decode the A/V stream and may composite or render the complete web page by combining the images associated with the supported content 524 (dotted pattern) rendered by the STB 500 and the unsupported content 522 (dashed lines) processed by the server 550.

The approach or scheme described above with respect to FIGS. 5A and 5B may correspond to a two-pass approach that is described in more detail below. Other embodiments of the invention, however, may be performed utilizing a single-pass approach, also described below.

Figure 6A:
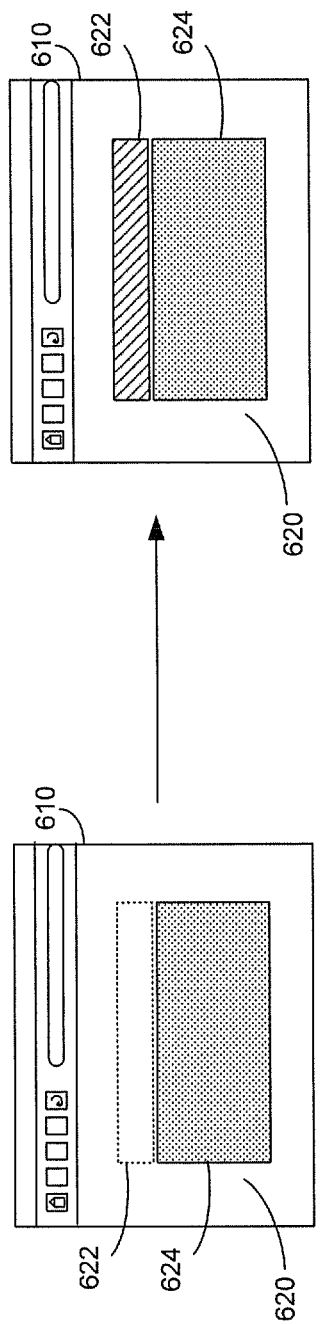
FIG. 6A is a diagram that illustrates a two-pass approach for partial web browsing support of an STB by server processing, in accordance with an embodiment of the invention.

FIG. 6A is a diagram that illustrates a two-pass approach for partial web browsing support of an STB by server processing, in accordance with an embodiment of the invention. Referring to FIG. 6A, there is shown a web browser 610 in which a web page 620 that is to be composited by an STB is illustrated. The web page 620 may comprise a portion 624 (shown in a dotted pattern) that is supported by the web browser 610. The web page 620 may also comprise a portion 622 (shown blank) that is unsupported by the web browser 610.

During a first compositing pass (Pass 1) shown in FIG. 6A, the STB may determine that portion 622 of web page 620 may need processing by a server and may send a request or requests to that server to process the portion 622 of web page 620. During Pass 1, the STB may render the portion 624 of the web page 620 supported by the web browser 610.

During a second compositing pass (Pass 2) shown in FIG. 6A, the STB may receive a data stream from the server and may decode the data stream. The decoded data associated with the unsupported portion 622 may be placed or overlaid in the appropriate location on the web page 620 by the web browser 610 with the already rendered supported portion 624 to composite the complete web page 620.

Figure 6B:
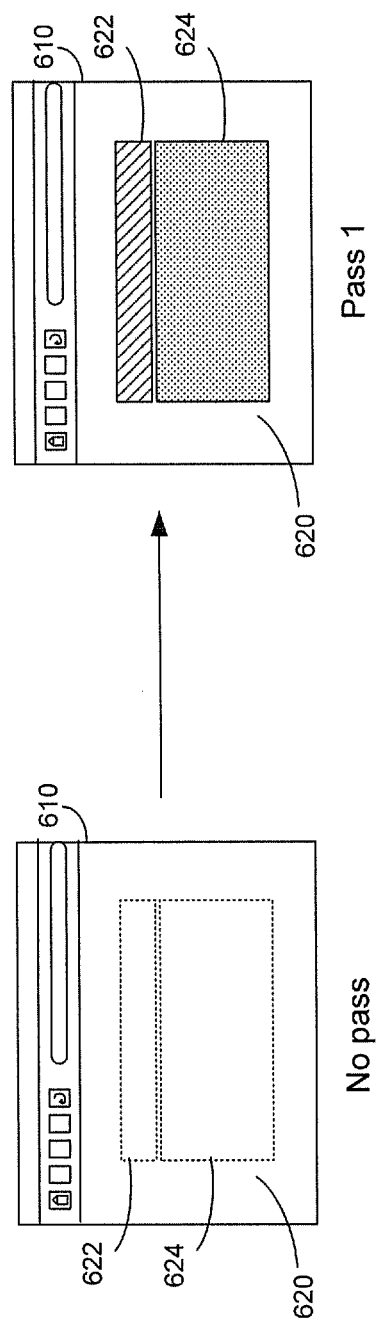
FIG. 6B is a diagram that illustrates a single-pass approach for partial web browsing support of an STB by server processing, in accordance with an embodiment of the invention.

FIG. 6B is a diagram that illustrates a single-pass approach for partial web browsing support of an STB by server processing, in accordance with an embodiment of the invention. Referring to FIG. 6B, there is shown the web browser 610 in which the web page 620 that is to be composited by an STB is illustrated. As described above, the web page 620 may comprise the portion 624 (shown in a dotted pattern) that is supported by the web browser 610 and the portion 622 (shown blank) that is unsupported by the web browser 610.

Initially, the STB may determine that portion 622 of web page 620 may require processing by a server and may send one or more requests to that server to process the portion 622 of web page 620. At this stage, the STB may not yet render the portion 624 of the web page 620 supported by the STB and the web browser 610.

During a first compositing pass (Pass 1) in FIG. 6B, the STB may receive a data stream from the server and may decode the data stream. The decoded data associated with the unsupported portion 622 may be placed in the appropriate location on the web page 620 by the web browser 610 concurrently with the rendering of the supported portion 624 to composite the complete web page 620.

Figure 7:
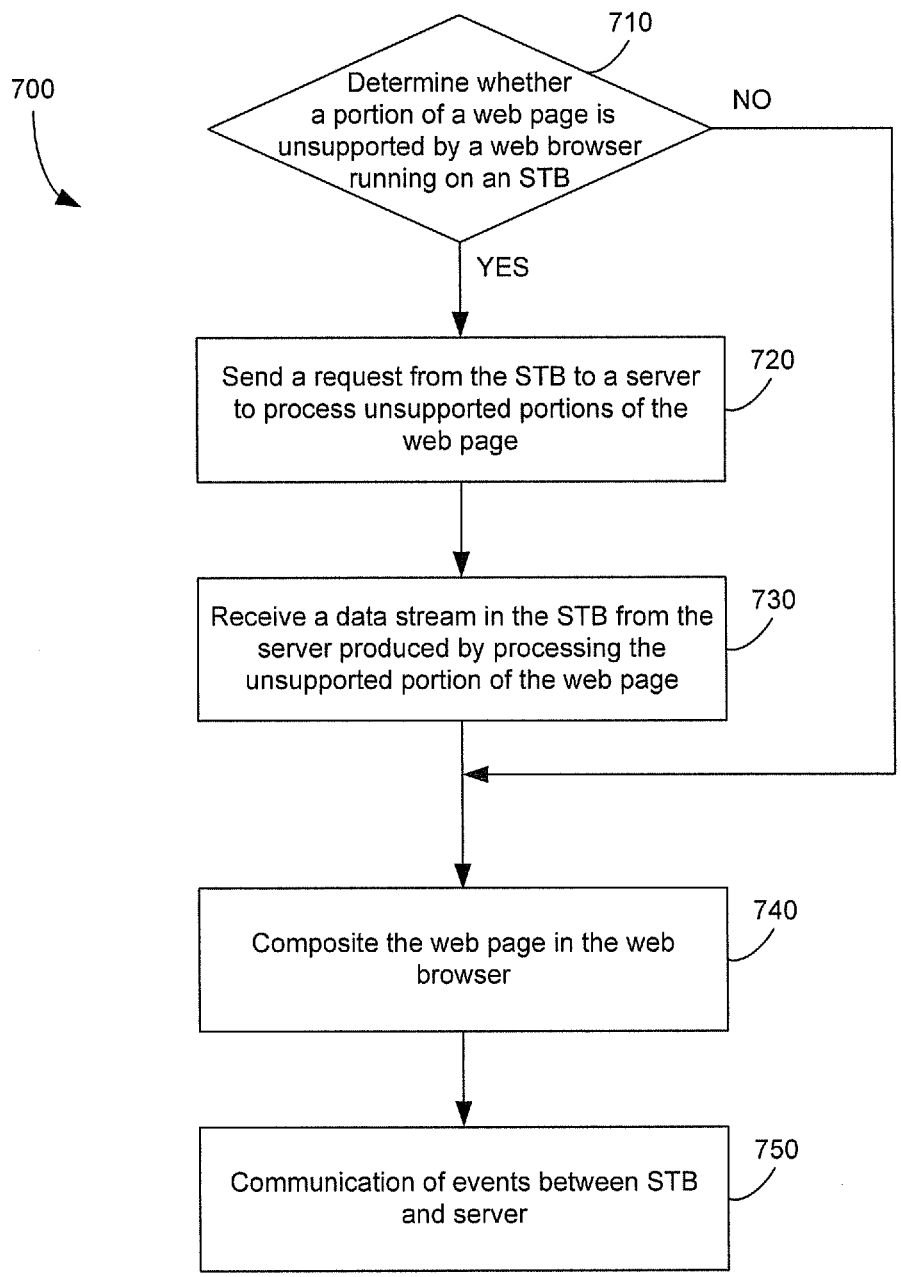
FIG. 7 is a flow diagram that illustrates exemplary steps for partial web browsing support of an STB by server processing, in accordance with an embodiment of the invention.

FIG. 7 is a flow diagram that illustrates exemplary steps for partial web browsing support of an STB by server processing, in accordance with an embodiment of the invention. Referring to FIG. 7, there is shown a flow diagram 700. In step 710, an STB for example, STB 120, may determine whether a portion of a web page is unsupported by a web browser running on the STB. That is, the STB may determine the type of content comprised in the web page. In instances when the web page does not comprise an unsupported portion, the process may proceed to 740 and the STB may render the web page directly. In instances when the web page comprises one or more unsupported portions (for example, plug-ins), the process may proceed to step 720.

At step 720, the STB may send a request to a server (for example, server local 130, remote server 190) communicatively coupled to the STB to assist in the web browsing operation by processing the unsupported portion or portions of the web page. At step 730, after the server has processed the unsupported portion or portions of the web page, the STB may receive a data stream (for example, an A/V data stream) from the server. At step 740, when a data stream is received from the server, the STB may composite the complete web page based on the supported portion of the web page that is rendered by the STB and the unsupported portion that is received via the data stream from the server.

At step 740, the STB may provide the server with information related to certain events. For example, the STB may provide to the server information associated with keystroke or click events, and/or information associated with the actual pointer location information. The STB may send the event information to the server when such events occur. The STB may send the actual pointer location information to the server either periodically or in some other manner. The server may utilize the information provided by the STB for synchronization between the server and the STB, for example. While step 740 has been shown in the example illustrated in FIG. 7 at the end of the flow graph 700, such step need not be so limited and may occur at other instances along the flow graph 700. In some instances, the server may also provide the STB with information that may be utilized for synchronization. In some embodiments of the invention, the server may utilize event and/or actual pointer location information to perform prediction operations on interactive content.

The flow graph 700 may correspond to both a two-pass and a single-pass approach to compositing a web page in a web browser when a portion of the web page is unsupported by the web browser.

Referring back to FIGS. 5A and 5B, in one embodiment of the invention, the STB 500 may send a request to the server 550, which is communicatively coupled with the STB 500, to process a portion 522 of the web page 520 that is unsupported by the web browser 510 running on the STB 500. The STB 500 may receive a data stream from the server 550, wherein the server 550 may generate the data stream by processing the unsupported portion 522 of the web page 520. Moreover, the web page 520 in the web browser 510 may be composited based on the received data stream. The server 550 may be located in a server computing cloud or may be a local server.

It may be determined, during a pre-fetch process in the STB 500, which portion of the web page 520 is unsupported by the web browser 510. It may also be determined a type of content in the web page 520. In some instances, such determination may be made during a background process performed by the STB 500.

A portion 524 of the web page 520 may be supported by the web browser 510. In some instances, the supported portion 524 of the web page 520 may be rendered before the data stream associated with the unsupported portion 522 of the web page 520 is overlaid during compositing. In other instances, the supported portion 524 of the web page 520 may be rendered concurrently with overlaying of the data stream associated with the unsupported portion 522 of the web page 520 during compositing. The unsupported portion 522 of the web page 520 may comprise a binary plug-in. The request sent by the STB 500 may comprise one or both of a Uniform Resource Identifier associated with the unsupported portion 522 of the web page 520 and a size of the unsupported portion 522 of said the web page 520.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for providing complete Internet anywhere with partial server processing.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   sending a request from a set-top-box (STB) to a server communicatively coupled with said STB to process a portion of a web page that is unsupported by a web browser running on said STB;
   determining, during a prefetch process in said STB, which portion of said web page is unsupported by said web browser;
   receiving by said STB, a data stream from said server, wherein said server generates said data stream by processing said unsupported portion of said web page; and
   compositing said web page in said web browser based on said received data stream.

2. The method according to claim 1, comprising determining a type of content within said web page.

3. The method according to claim 1, comprising rendering a supported portion of said web page before said data stream associated with said unsupported portion of said web page is overlaid during said compositing.

4. A method comprising:
   sending a request from a set-top-box (STB) to a server communicatively coupled with said STB to process a portion of a web page that is unsupported by a web browser running on said STB;
   determining a type of content within said web page during a background process performed by said STB;
   receiving by said STB, a data stream from said server, wherein said server generates said data stream by processing said unsupported portion of said web page; and
   compositing said web page in said web browser based on said received data stream.

5. The method according to claim 4, comprising rendering a supported portion of said web page concurrently with overlaying of said data stream associated with said unsupported portion of said web page during said compositing.

6. A method comprising:
   sending a request from a set-top-box (STB) to a server communicatively coupled with said STB to process a portion of a web page that is unsupported by a web browser running on said STB, wherein said unsupported portion of said web page comprises a binary plug-in;
   receiving by said STB, a data stream from said server, wherein said server generates said data stream by processing said unsupported portion of said web page; and
   compositing said web page in said web browser based on said received data stream.

7. A method comprising:
   sending a request from set-top-box (STB) to a server communicatively coupled with said STB to process a portion of a web page that is unsupported by a web browser running on said STB, wherein said request comprises a size of said unsupported portion of said web page;
   receiving by said STB, a data stream from said server, wherein said server generates said data stream by processing said unsupported portion of said web page; and
   compositing said web page in said web browser based on said received data stream.

8. The method according to claim 7, wherein said request comprises a Uniform Resource Identifier associated with the unsupported portion of said web page.

9. A system, comprising:
   one or more processors, circuits, or a combination thereof, in a set-top-box (STB), said one or more processors, circuits, or combination thereof being operable to:
   send a request from to a server communicatively coupled with said STB to process a portion of a web page that is unsupported by a web browser running on said STB;
   determine, during a pre-fetch process in said STB, which portion of said web page is unsupported by said web browser;
   receive a data stream from said server, wherein said server generates said data stream by processing said unsupported portion of said web page; and
   composite said web page in said web browser based on said received data stream.

10. The system according to claim 9, wherein said one or more processors, circuits, or combination thereof are operable to determine a type of content within said web page.

11. The system according to claim 9, wherein said one or more processors, circuits, or combination thereof are operable to render said supported portion of said web page concurrently with overlaying of said data stream associated with said unsupported portion of said web page during said compositing.

12. A system, comprising:
   one or more processors, circuits, or a combination thereof, in a set-top-box (STB), said one or more processors, circuits, or combination thereof being operable to:
   send a request from to a server communicatively coupled with said STB to process a portion of a web page that is unsupported by a web browser running on said STB;
   determine a type of content within said web page during a background process performed by said STB;
   receive a data stream from said server, wherein said server generates said data stream by processing said unsupported portion of said web page; and
   composite said web page in said web browser based on said received data stream.

13. The system according to claim 12, wherein said one or more processors, circuits, or combination thereof are operable to render said supported portion of said web page before said data stream associated with said unsupported portion of said web page is overlaid during said compositing.

14. The system according to claim 12, wherein said request comprises a Uniform Resource Identifier associated with the unsupported portion of said web page.

15. A system, comprising:
one or more processors, circuits, or combination thereof, in a set-top-box (STB), said one or more processors, circuits, or combination thereof being operable to:
send a request from to a server communicatively coupled with said STB to process a portion of a web page that is unsupported by a web browser running on said STB, wherein said unsupported portion of said web page comprises a binary plug-in;
receive a data stream from said server, wherein said server generates said data stream by processing said unsupported portion of said web page; and
composite said web page in said web browser based on said received data stream.

16. A system, comprising:
one or more processors, circuits, or a combination thereof, in a set-top-box (STB), said one or more processors, circuits, or combination thereof being operable to:
send a request from to a server communicatively couple with said STB to process a portion of a web page that is unsupported by a web browser running on said STB, wherein said request comprises a size of said unsupported portion of said web page;
receive a data stream from said server, wherein said server generates said data stream by processing said unsupported portion of said web page; and
composite said web page in said web browser based on said received data stream.

17. A method comprising:
sending a request from a set-top-box (STB) to a server communicatively coupled with said STB to process a portion of a web page that is unsupported by a web browser running on said STB;
determining which portion of said web page is unsupported by said web browser;
receiving by said STB, a data stream from said server, wherein said server generates said data stream by processing said unsupported portion of said web page; and
compositing said web page in said web browser based on said received data steam.

18. A system, comprising:
one or more processors, circuits, or a combination thereof, in a set-top-box (STB), said one or more processors, circuits, or combination thereof being operable to:
send a request from to a server communicatively coupled with said STB to process a portion of a web page that is unsupported by a web browser running on said STB;
identify which portion of said web page is unsupported by said web browser;
receive a data stream from said server, wherein said server generates said data stream by processing said unsupported portion of said web page; and
composite said web page in said web browser based on said received data stream.

* * * * *